May 5, 1942.  V. V. VACQUIER  2,281,960
APPARATUS FOR LOGGING BORES
Filed July 26, 1939  2 Sheets-Sheet 1
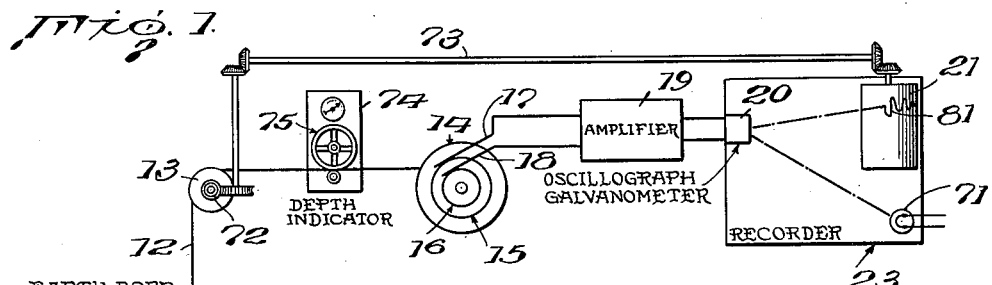
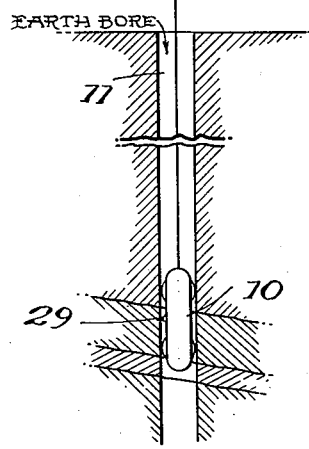
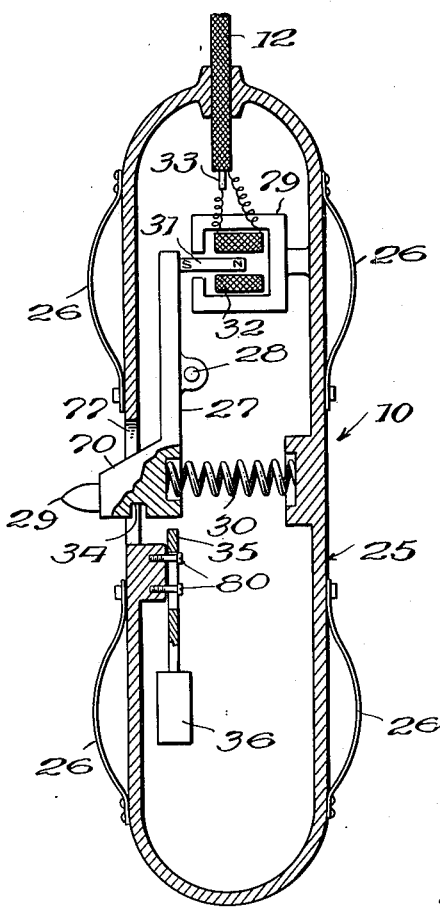
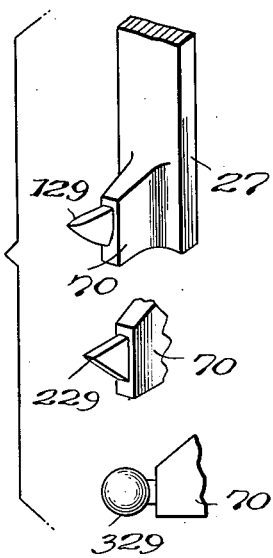
Inventor
V. V. VACQUIER, May 5, 1942.  V. V. VACQUIER  2,281,960
APPARATUS FOR LOGGING BORES
Filed July 26, 1939  2 Sheets-Sheet 2

Inventor
V. V. VACQUIER,
By A. M. Houghton
his Attorney

Patented May 5, 1942

2,281,960

UNITED STATES PATENT OFFICE 2,281,960

APPARATUS FOR LOGGING BORES

Victor V. Vacquier, Oakmont, Pa., assignor to Gulf Research & Development Company, Pittsburgh, Pa., a corporation of Delaware Application July 26, 1939, Serial No. 286,671

3 Claims. (Cl. 73—51)

This invention relates to apparatus for logging bores.

In oil and gas well drilling and production, it is desirable to be able to trace characteristic strata or other geological formations from one well to another without having to take core samples in the several wells. Electrical well logging has come into use with this object in view. In electrical logging, the electrical resistivity of the earth is measured at various levels in the well, by lowering a suitable electrode assemblage down the well and recording potential differences between two of the electrodes, at various levels in the well. Electrical well logging gives useful results but requires elaborate apparatus and skilled operators. Moreover, the method has the inherent disadvantage that electrical resistivity is not a characteristic of rock itself, but depends entirely on the water content of the rock. Dry rock is non-conductive. Accordingly, fluctuations in water content of rocks over an area under investigation may obscure correlation among strata in different wells.

Among the objects of the present invention is the provision of an apparatus for well logging, especially suited for use in stratigraphic correlation, which includes means for drawing over and in contact with the well walls, a resiliently mounted member adapted to be mechanically vibrated by such moving contact, and means for recording the vibrations and correlating them with the depth of the member in the well.

The present invention is based on the discovery that a hard metal point or other hard stylus, drawn at a moderate velocity over the exposed rock in a well bore while being pressed against the rock under resilient pressure, is set into vibration by such passage, and that the vibrations are sufficiently different for various types of strata so that by recording the vibrations, and repeating the steps in other wells, strata can be traced from one well to another. The amplitude and frequency and shape of the vibrations all depend on several factors, some of which are indeterminable. But the recorded vibrations of the stylus in passing over a given rock stratum in one well are sufficiently peculiar to that stratum, so that the same stratum, or its interface with upper or lower strata, can be identified by the recorded vibrations in nearby wells. The exact shape of the stylus depends on the general character of the rocks surrounding the well. Very soft rocks are best tested with a more or less blunt stylus, while hard rocks give more useful results with a sharper stylus.

In the apparatus of the invention, a stylus is provided in a housing adapted to be lowered down a well on a cable. The stylus is pressed outwardly by a spring, and means, usually of electrical or optical type, are provided for registering the vibrations of the stylus. The vibrations are recorded as a permanent record and provision is made for correlating all parts of the record with the corresponding well depth.

In the accompanying drawings there are shown in diagrammatic manner five examples of specific embodiments of apparatus within the purview of the invention; also a typical chart produced with the aid of the apparatus. In the drawings, Fig. 1 is a view of the apparatus in the well together with the recording system;

Fig. 2 is a view partly in central vertical section and partly in elevation of the testing apparatus;

Fig. 5 shows three optional forms of styli.

Figure 3:
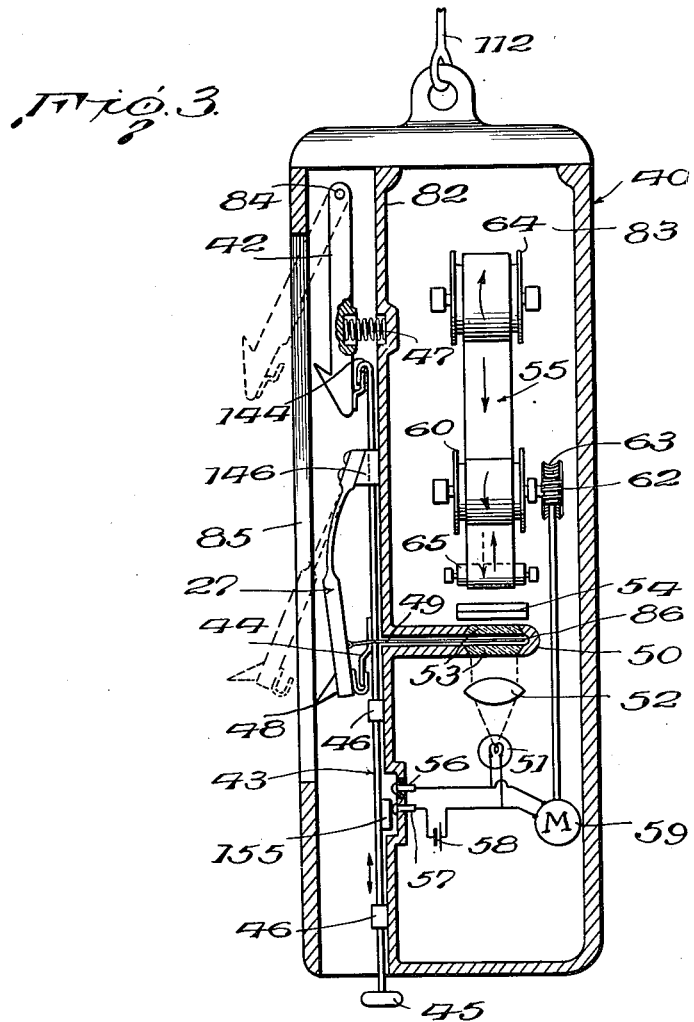
Fig. 3 is a similar view of a modified form of testing apapratus.

Referring to the drawings, Fig. 1 shows the complete system, including a tester 10 (shown in detail in Fig. 2) arranged for lowering into a well 11 on a cable 12 which passes over a pulley 13 and thence to a drum 14. The cable is of flexible metal construction and contains an inner wire 33 insulated therefrom (Fig. 2). The cable and the inner wire are connected to collector rings 15 and 16 on the drum, which communicate with brushes 17 and 18 whence current is taken and amplified in an amplifier 19. The amplified current is applied to a recorder 23 having an oscillograph element 20 arranged to vibrate a beam of light from a lamp 71 over a traveling record surface 21 of photographic sensitized material (paper or film). This drum is driven in synchronism with pulley 13 by speed reducing gearing 72 and shafting 73. The drum can be driven at constant speed, if desired. A conventional depth measuring device 74 including a wheel 75 rotated by the cable permits the depth of the tester to be read at any time.

The tester itself, as shown in Fig. 2, includes a housing or casing 25 centered or guided in the bore by springs 26. In the casing is mounted a lever 27 fulcrumed to the casing at 28 and having a socket portion 70 from which protrudes a stylus 29 extending through a slot 77 in the casing. The lever and stylus are urged outwardly by a spring 30. The other end of the lever carries a permanent magnet 31, extending into a waterproofed coil 32 electrically connected to wire 33 and to cable 12 as shown, and surrounded by a pole piece 79, as shown. A latch is provided comprising a slotted strip 35 adapted to engage a slot 34 in the lever, guided by screws 80 and carrying a weight 36, as shown. Before lowering the apparatus into the well, strip 35 is moved up into the slot to hold the stylus lever in retracted position. The device is then lowered to the lowermost level which it is desired to test and sharply jerked upwardly, which releases latch 35.

In operation the tester is lowered to the bottom of the well or to some intermediate level and then raised at a uniform speed by means of drum 14 (the power means being omitted from the figure). A few yards per minute is a suitable speed. Point 29 scrapes along the well, as shown in Fig. 1, and is set into vibration. The vibration of the lever produces an oscillating current in the cable which is recorded as a trace 81 on the recorder paper. This trace shows characteristic vibrations, the significance of which is described below in connection with Fig. 4. The amplitude of the vibrations depends on the rugosity and nature of the rock traversed and the rate at which the tester is moved.

Fig. 3 shows a modification making use of optical recording in the tester itself. Referring to Fig. 3, a water-tight casing 40 is provided; it is arranged for attachment to a cable 112 which can be an ordinary "Halliburton wire," no electrical connections being necessary. The casing contains a partition 82 to enclose a water-tight space 83. On the partition is mounted a spring stylus member 27 having a sharp point 48. A hook 42 is pivoted to the casing at 84 and is urged outwardly by a spring 47. This hook is for the purpose of scraping away the mud sheath when the test is made in a mud-lined hole, so that the stylus acts on the rock itself. The hook and the stylus member are held in retracted position by a latch 43 having detent portions 144 and 44 engaging the mud hook and the stylus member, respectively, as shown, and sliding in guides 46 and 146. The lower end of the latch has a button 45 protruding below the casing so that by lowering the casing to the bottom the latch is caused to release the mud hook and the stylus. The casing has an elongated slot 85 through which the mud hook and the stylus extend when they are released.

The stylus member has attached thereto a thin metal shutter-vane 49 extending into a slot 86 in a partition 50 in space 83, as shown. The slot 86 may be provided at its open end with a packing gland or a diaphragm and pressure equalizing device to prevent entry of fluid such as muddy well water into the slot. The partition contains two glasses 53 in water-tight, pressure-tight relation to the partition. Below the partition is a lamp 51 and lens 52 arranged to direct light up through the glasses, as a beam which is obscured by shutter 49. Above the partition is a cylindrical lens 54 which focuses the light as a line (in the plane of the drawings) upon a strip of photographic sensitized material 55. This strip is unwound from a reel 64 past a roller 65 opposite lens 54 and thence on a take-up reel 60, driven by worm wheel 63, worm 62 and a motor 59.

The lamp and the motor are supplied by a battery 58 in a circuit including switch points 56 and 57 closed by a contact member 155 on the latch 43 at the time that the stylus and the mud hook are released.

Figure 4:
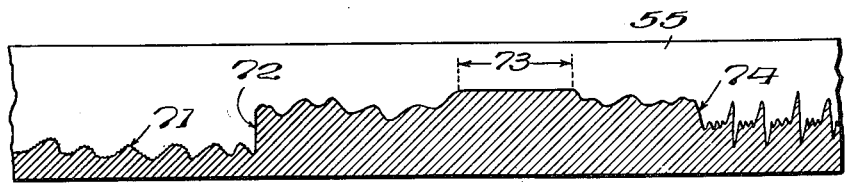
Fig. 4 is a reproduction of a chart such as is obtained with the apparatus.

In operation the apparatus is lowered to the well bottom and latch 43 releases. The tester is then raised at a uniform rate, a record being kept at the surface, of the depth at any given extent of time. Stylus 48 moves over the rock and is caused to vibrate in a characteristic manner. This vibration causes fluctuations in the width of the beam passing through glasses 53 and produces a record of the type indicated in Fig. 4. Fig. 4 shows a small section of a record obtained under representative conditions. Reading from the left, at 71 a wavy edge is discerned having very fine wiggles superposed on undulations of greater amplitude and lower frequency. The fine wiggles often indicate a hard formation, whereas the larger wiggles are due to roughness or irregularity of the stratum face. At 72 the character of the record changes. The unit is now in a softer formation as indicated by the fact that only low frequencies are present, and incidentally by the height of the record which shows that the stylus is penetrating more deeply. The tester is stopped at regular depth intervals, say at 3200, 3150, 3100, etc., feet, so as to provide identification "rests" on the chart. One such rest shows at 73. If this is, for example, the fifth rest noted on the chart, and it is known that the fifth rest occurred at 3050 feet, the depth of the strata below and above the rest period can be determined. Upon resumption of movement of the apparatus the record continues to be of a similar character to that before rest 73 until point 74 is reached, where it is apparent that a new formation has been encountered. The new formation gives rise to a distinctive wave shape probably caused by very uniform stratification characteristic of certain shales. Records obtained by the apparatus of Fig. 2 resemble those obtained with the apparatus of Fig. 3.

The record of Fig. 4 enables stratigraphic correlation to be made between two or more wells. For example, if the test, the record of which appears in Fig. 4, is repeated in a nearby well, similar peculiarities will be observed though usually at different depths because subsurface strata are rarely strictly horizontal. For example, break 72 may occur at depth 3200 in one well and at depth 3240 in another well a half mile away. This indicates down-dip of this stratum interface in the direction of the second well.

The stylus shown in Fig. 2, a blunt point, is useful for average well conditions. Fig. 5 shows three alternative forms of styli. A sharp tooth-like stylus 129 is useful for logging wells which traverse very hard rock. In some cases a chisel stylus 229 gives better results, while for very soft formations a ball 329 is useful. The styli and in particular the sharper forms are best made of hard material such as hardened tool steel. Tungsten carbide and diamond points can be employed. The rest of the apparatus is embodied in the materials usual for oil well apparatus, such as steel or bronze.

The springy stylus support 27 of Fig. 3, and the lever-spring combination 27, 30 of Fig. 2, are constructed and arranged to have a natural vibratory frequency outside the range of frequencies to be recorded, to avoid spurious vibration records. The frequencies of interest in the present invention are ordinarily relatively high and the spring supported stylus is generally made to have a natural frequency above the interesting range. Referring to Figs. 1 and 2, the cable 12 employed is ordinarily used unloaded electrically and is of sufficient proportions so that its cutoff frequency is rather high, thereby avoiding suppression of the high frequency vibrations of interest. Amplification and equalization in such a cable circuit is achieved without difficulty.

What I claim is:

1. An apparatus for logging earth bores comprising a supporting member adapted to be lowered in an earth bore, means for suspending the supporting member in the bore, a stylus resiliently supported on the supporting member for pressure against the bore wall, means for recording vibrations of the stylus as the stylus moves over the bore wall and depth-measuring means for measuring and exhibiting the depth of the stylus at various positions in the bore.

2. An apparatus for logging earth bores comprising a supporting member adapted to be moved along an earth bore, means for suspending the supporting member in the bore, a stylus elastically supported on the supporting member and adapted to engage the bore wall, means for producing fluctuations in a beam of light corresponding to the vibrations of the stylus, means for recording said light fluctuations photographically and means for measuring and exhibiting the depth of the stylus in the bore.

3. An apparatus for logging earth bores comprising a support adapted to be lowered in an earth bore adjacent the wall thereof, means for suspending the support in the bore, a relatively high frequency vibration-susceptible member mounted on the support in contact with the bore wall and resiliently pressed against the bore wall with sufficient pressure to indent the rock of the bore wall, means for recording vibrations of the vibration-susceptible member as it moves over the bore wall, and means for measuring and exhibiting the depth of the member at various levels in the bore.

VICTOR V. VACQUIER.